United States Patent
Erentok et al.

(10) Patent No.: US 11,366,431 B2
(45) Date of Patent: Jun. 21, 2022

(54) MULTI-FUNCTION ANTENNA AND INPUT INTERFACE

(71) Applicant: Intel Corporation, Santa Clara, CA (US)

(72) Inventors: Aycan Erentok, Sunnyvale, CA (US); Rajashree Raji Baskaran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/280,060

(22) Filed: Sep. 29, 2016

(65) Prior Publication Data

US 2018/0088724 A1    Mar. 29, 2018

(51) Int. Cl.
| | |
|---|---|
| *G04G 21/08* | (2010.01) |
| *G06F 1/16* | (2006.01) |
| *G06F 3/033* | (2013.01) |
| *G06F 3/02* | (2006.01) |
| *G06F 3/041* | (2006.01) |
| *G04R 60/00* | (2013.01) |

(52) U.S. Cl.
CPC ............. *G04G 21/08* (2013.01); *G06F 1/169* (2013.01); *G06F 1/1698* (2013.01); *G06F 3/0227* (2013.01); *G06F 3/033* (2013.01); *G06F 3/041* (2013.01); *G04R 60/00* (2013.01)

(58) Field of Classification Search
USPC ........................................................ 600/426
See application file for complete search history.

(56) References Cited

U.S. PATENT DOCUMENTS

| | | | |
|---|---|---|---|
| 6,043,644 A | 3/2000 | De Coulon et al. | |
| 6,356,512 B1 | 3/2002 | Martin et al. | |
| 9,203,463 B2 | 12/2015 | Asrani et al. | |
| 2007/0109208 A1* | 5/2007 | Turner | H01Q 1/273 343/718 |
| 2009/0059730 A1 | 3/2009 | Lyons et al. | |
| 2010/0259474 A1 | 10/2010 | Hildreth | |
| 2010/0321325 A1* | 12/2010 | Springer | G06F 3/041 345/174 |
| 2012/0214412 A1 | 8/2012 | Schlub et al. | |
| 2013/0109961 A1* | 5/2013 | Bose | H04B 10/116 600/426 |
| 2013/0162517 A1 | 6/2013 | Gay | |
| 2014/0139422 A1 | 5/2014 | Mistry et al. | |
| 2014/0225786 A1* | 8/2014 | Lyons | G04G 21/04 343/702 |
| 2015/0167193 A1 | 6/2015 | Demers | |

(Continued)

OTHER PUBLICATIONS

Morganti, Elisa, et al., "A smart watch with embedded sensors to recognize objects, grasps and forearm gestures", Procedia Engineering, vol. 41, (2012), 1169-1175.

(Continued)

*Primary Examiner* — Andre L Matthews
(74) *Attorney, Agent, or Firm* — Schwegman Lundberg & Woessner, P.A.

(57) ABSTRACT

A multi-function input interface for an electronic device. The multi-function input interface including a conductive portion to transceive a signal through the input interface. The input interface includes a positional element to detect a user input to the input interface.

25 Claims, 4 Drawing Sheets

(56) References Cited

U.S. PATENT DOCUMENTS

| | | | | |
|---|---|---|---|---|
| 2015/0212603 A1* | 7/2015 | Raisch | ................... | G06F 3/044 |
| | | | | 345/174 |
| 2015/0346768 A1* | 12/2015 | Popalis | .................. | G06F 1/163 |
| | | | | 361/679.03 |
| 2016/0004393 A1 | 1/2016 | Faaborg et al. | | |
| 2016/0252888 A1* | 9/2016 | Kim | ....................... | G04G 21/00 |
| | | | | 368/278 |
| 2017/0090599 A1* | 3/2017 | Kuboyama | ............. | G06F 3/038 |
| 2017/0179996 A1* | 6/2017 | Knepper | ................. | H04B 1/40 |
| 2017/0214422 A1* | 7/2017 | Na | ........................... | H01Q 5/35 |
| 2017/0358850 A1* | 12/2017 | Vanjani | .................... | H01Q 5/30 |

OTHER PUBLICATIONS

Wong, Raymond, "You may be able to control Samsung's next smartwatch by rotating its bezel". Mashable, [Online]. Retrieved from the Internet: <URL: http://mashable.com/2015/05/13/samsung-smartwatch-rotating-bezel/#d5R60t8Wikqt>, (May 15, 2015), 5 pgs.

"International Application Serial No. PCT/US2017/045880, International Search Report dated Nov. 20, 2017", 3 pgs.

"International Application Serial No. PCT/US2017/045880, Written Opinion dated Nov. 20, 2017", 9 pgs.

\* cited by examiner

MULTI-FUNCTION ANTENNA AND INPUT INTERFACE

TECHNICAL FIELD

This document pertains generally, but not by way of limitation, to electronic devices, such as electronic devices for wireless communication.

BACKGROUND

Electronic apparatuses for wireless communication may include one or more antennas. Examples of electronic apparatuses may include mobile phones, smart watches, computers (e.g., laptops, tablets, or other), radios, music players, Internet of Things (JOT) devices, activity trackers, digital cameras, electronic entertainment devices, home security or smart home devices, remote controls for appliances (e.g., televisions), heating and cooling systems, or the like. Antennas may be used for wireless communication with other electronic apparatuses or systems. For instance, the antennas are often used for sending and receiving cellular, wireless local access network, Wi-Fi, or other wireless signals. The antennas may be internal or external to the electronic apparatus. For instance, antennas are sometimes located within a housing of the electronic apparatus or other times may be fastened or extendable from an exterior of the housing. The antennas may be used to send and receive messages for voice data, commands, change settings, or other commands. Separate mechanical or electrical controls may be used by the user to provide commands to the electronic apparatus. For instance, the mechanical or electrical controls may include buttons, switches, knobs, touch screens, or other controls. The mechanical or electrical controls may be located on the exterior of electronic apparatuses for the user to touch or grasp in order to enter one or more commands. In response, the user may instruct the electronic apparatus to conduct certain operations, such as making a voice call, sending a text message, browsing the internet, taking photos, or other operations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
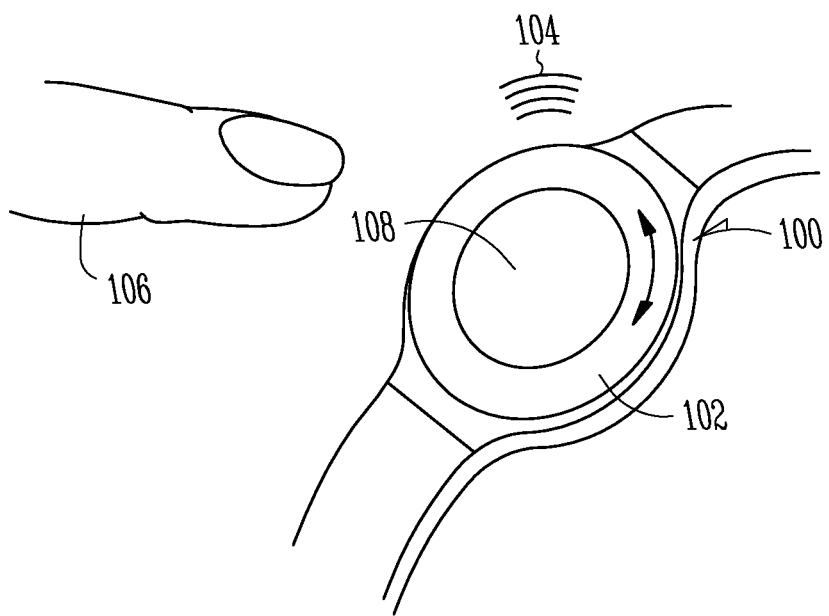
FIG. 1 illustrates an example of an electronic device including a multi-function input interface, according to an embodiment.

The present application relates to devices and techniques for a multi-function input interface, such as an input interface adapted to transceive a signal and detect a user input. The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

As electronic devices continue to decrease in size, the space for components of the electronic device decreases accordingly. Cosmetic design consideration may impact the size and placement of various components of electronic devices as well. In some examples, the technological capabilities of electronic devices are increasing, even for more traditional electronic devices, such as electronic wristwatches. For instance, smart watches may include a mobile phone, radio, mobile app, graphical display, touch screen, camera, activity tracking, GPS, and GNSS capabilities. Consequently, designers of electronic devices are faced with incorporating more components and more functionality into increasingly smaller spaces.

According to the present disclosure, an electronic device may include a multi-function input interface. The multi-function input interface may increase the functionality of a component of the electronic device, such as a cosmetic component. For instance, the functionality of the input interface may be increased by combining functions of two or more components, such as an input interface and an antenna into one multi-function input interface. Accordingly, the multi-function input interface may reduce the number of components of the electronic device and correspondingly reduce the size of the electronic device.

For example, the multi-function input interface for an electronic device may include a conductive portion to transceive a signal through the input interface, and the input interface may include a positional element to detect a user input. A transceiver may be communicatively coupled, for instance by an antenna feed, to the conductive portion to transceive the signal. The conductive portion may be an antenna or part of an antenna, including but not limited to, a monopole antenna, a Planar Inverted-F antenna, loop antenna, or other type of antenna. In an example, the electronic device may include a circuit, such as a circuit board, communicatively coupled between the conductive portion and a processing unit. The circuit may include a ground element, and a ground feed may be coupled between the conductive portion and the ground element. A dielectric may be disposed between the conductive portion and the ground element. The ground element can also be electrically coupled to other conductive parts of the electronic device. In various examples, the input interface may be moveable. For instance, the input interface may be an annular bezel and may be rotatable about a center axis of the bezel to receive the user input. In a further example, the input interface may be a slider. The positional element of the input interface may include, but is not limited to a sensor to detect pressure, capacitance, resistance, inductance, electric field, magnetic field, a magnet, fiducial marker, or other component contributing to the detection of a user input to the input interface. In an example, an optical sensor may detect a fiducial marker attached to the input interface. In a further example, a sensor may detect a position of a magnet attached to the input interface.

Accordingly, the multi-function input interface may function as both an antenna and an input interface to reduce the size of the electronic device. Placing the antenna away from the body of the user may reduce near-field electromagnetic (EM) radiation absorption and thus improve antenna performance.

FIG. 1 illustrates an example of an electronic device 100 including a multi-function input interface, according to an embodiment. The electronic device 100 may include, but is not limited to, a mobile device, wearable device, Internet of Things (TOT) Device, thermostat, or other electronic device. In the example of FIG. 1 the electronic device 100 is a wristwatch. The wristwatch may include an input interface 102 configured as a rotatable bezel, for instance, the rotatable bezel may be positioned around a lens 108 (e.g., crystal, polymer, or glass lens) of the wristwatch. The user 106 may rotate the input interface 102 (e.g., clockwise or counter-clockwise) to provide the user input.

The input interface 102 may include at least two functional capabilities. For example, in operation, the input interface 102 may transceive a signal 104 and detect a user input. As shown in the example of FIG. 1, the input interface 102 may include a cosmetic component of the electronic device 100. The user 106 may interact with the input interface 102 to provide a user input. For instance, the user 106 may touch, tap, or swipe along the input interface 102 to provide the user input. In another example, the user 106 may move the user input, for example, rotate or translate the input interface 102. In various examples, the input interface 102 may be a rocker or a slider. The user input may be an input to navigate menus, select items, change settings, input or send messages, or other functions. The input interface 102 may include a conductive portion to transceive (e.g., transmit, receive, or radiate) electro-magnetic signals. In various examples, the input interface may supplement or substitute for other antennas, input interfaces (e.g., buttons), user interfaces (e.g., touch screens), or the like.

Figure 2:
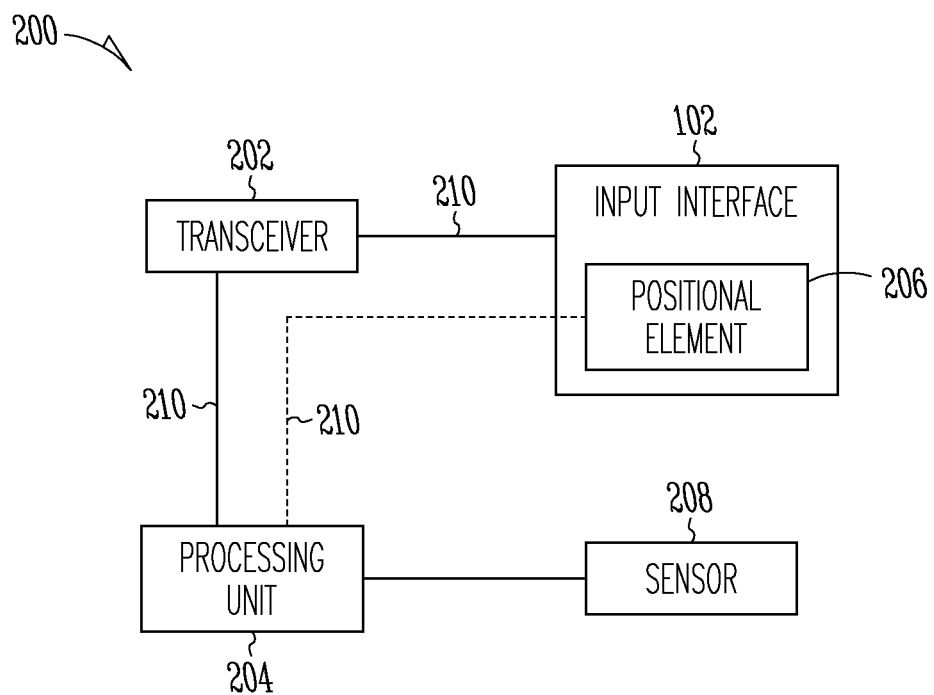
FIG. 2 is a system diagram of an electronic device including a multi-function input interface, according to an embodiment.

FIG. 2 is a system diagram 200 of an electronic device including a multi-function input interface, according to an embodiment. System diagram 200 of the electronic device, illustrates, for example, the electronic device 100 including the input interface 102. In the example of FIG. 2, the system diagram 200 may include the input interface 102, a transceiver 202, and a processing unit 204. The transceiver 202 may be communicatively coupled between the input interface 102 and the processing unit 204. For instance, as shown in FIG. 2, the processing unit 204 may be communicatively coupled to the transceiver 202, input interface 102, positional element 206, or sensor 208 through a circuit 210. The transceiver 202 may transmit or receive the signal 104 through the conductive portion of the input interface 102. The transceiver 202 may include an audio processor, oscillator, at least one amplifier, frequency selector, mixer, tunable RF switches or other transceiver component. In an example, the transceiver 202 may generate the signal (e.g., signal 104 shown in FIG. 1) that is transmitted by the input interface 102. In a further example, the signal 104 may be received by the transceiver 202 through the conductive portion of the input interface 102. The signal 104 may be any type of wireless signal. The signal 104 may be a cellular phone signal or a wireless data signal for a smartwatch. In a further example, the processing unit 204 may actively control the transceiver 202 to increase the quality of received or transmitted signals.

The input interface includes a positional element 206. The positional element 206 may be used to detect the user input to the input interface 102. For instance, the positional element 206 may include, but is not limited to, a sensor, such as a touch sensor to detect the user input to the input interface 102. In operation, the touch sensor may detect a change in pressure, capacitance, resistance, or inductance corresponding to the user input. In an example, the positional element 206 may include a capacitive touch sensor to detect a touch or gesture of the user 106 on the input interface 102. For instance, the input interface 102 may include an array of electrodes to detect a location of a user input on the input interface 102. The array of electrodes may be part of a capacitive sensing system, such as a surface capacitance system or a projected capacitance system. In an example, the input interface may be fixably attached to the electronic device 100, and the user 106 may move a finger along the input interface 102 to produce the user input (e.g., a swipe along the input interface 102). In a further example, the positional element 206 may detect a tap or other gesture to the input interface 102. The positional element 206 may output a parameter based on the user input for communication with the processing unit 204. The parameter may include positional information regarding the user input received from the touch-sensor. Positional information may include a degree of rotation, amount of travel (e.g., in mm, pixels, number of electrodes, or other degree of measure), or the like.

Optionally, the electronic device 100 may include a sensor 208 adapted to detect the positional element 206 as shown in FIG. 2. In an example, the positional element 206 may include a magnet, fiducial marker, or other positional element. A sensor 208 may detect the positional element 206 and correspondingly the position of the input interface 102. For instance, the sensor 208 may include an optical sensor configured to detect a fiducial marker attached to the input interface 102. The fiducial marker may be any type of symbol, indicia, or other optically detectable marking. In another example, the sensor 208 may detect a position of a magnet attached to the input interface. For instance, the sensor 208 may include an inductive sensor. In operation, the sensor 208 may detect when the positional element 206 is aligned with the sensor 208. In a further example, the input interface 102 may include a plurality of positional elements 206. One or more of the positional elements 206 may be different than other positional elements 206 to represent various positions of the input interface 102. For instance, the various positional elements may represent a length of travel, degree of rotation, or other measure of movement of the input interface 102. The sensor 208 may detect the various positional elements 206 and output different parameters based on which positional element 206 is detected or aligned with the sensor 208. In a further example, the electronic device 100 may include a plurality of sensors 208 to detect one or more positional elements 206. For instance, movement of the input interface 102 may be determined by which sensor detects the positional element 206.

The processing unit 204 may include but is not limited to, a processor, microcontroller (MCU), system-on-chip (SOC), Application specific integrated circuit (ASIC), central processing unit (CPU), graphics processing unity (GPU), field programmable gate array (FPGA), display driver, controller, computer, or the like. In an example, the processing unit 204 may include the transceiver 202. For instance, the transceiver 202 may be integrated into the processing unit 204. The processing unit 204 may be communicatively coupled to the transceiver 202, the input interface 102, the positional element 206, and the sensor 208. For instance, the processing unit 204 may be communicatively coupled through a circuit 210. The processing unit 204 may receive various inputs including, but not limited to, the signal 104, parameter, or both. The processing unit 204 may be configured to perform operations within the electronic device 100 to navigate menus, change settings, transmit or receive signals (e.g., signal 104), present information on a display, or other functions.

Figure 3:
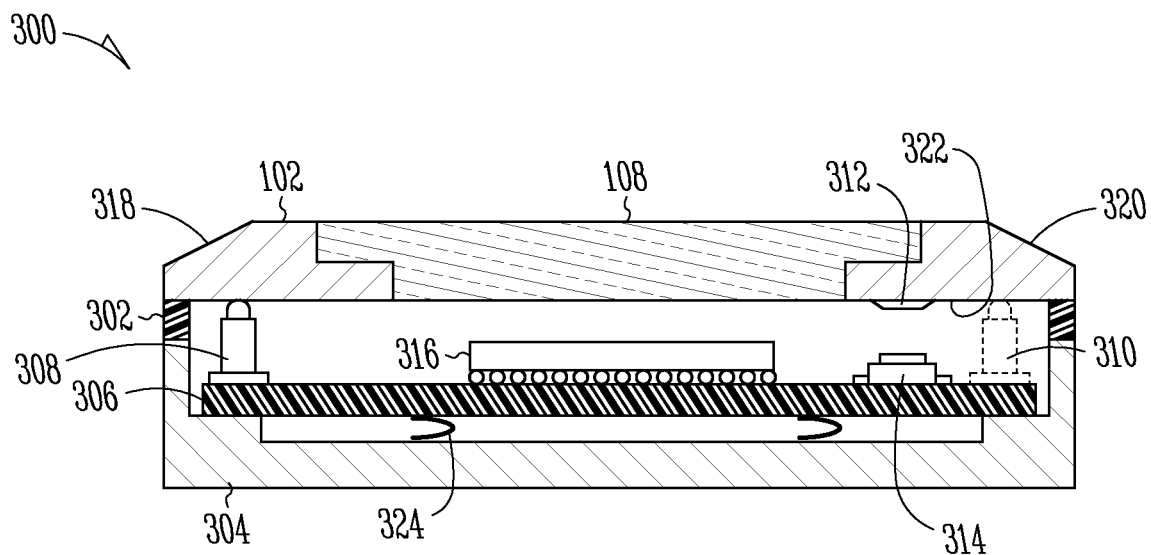
FIG. 3 illustrates an example of a cross section of an electronic device including a multi-function input interface, according to an embodiment.

FIG. 3 is an example of a cross section of an electronic device 300 including an input interface, according to an embodiment. Electronic device 300 may be include an input interface, such as input interface 102 of FIG. 1. The electronic device 300 may include a housing 304. The input interface 102 may be coupled to the housing 304, for instance, fixably or movably coupled to the housing 304. The electronic device 300 may include a processing unit 316 (e.g., the processing unit 204), transceiver 202, and sensor 208 as previously discussed and shown in the example of FIG. 2. The processing unit 204, transceiver 202, and sensor 208 may be communicatively coupled in a circuit 210, such as on a circuit board 306 as shown in the example of FIG. 3. An antenna feed 308 may communicatively couple a conductive portion 318 of the input interface 102 to the transceiver 202. For instance, in the example of FIG. 3, the transceiver 202 may be integrated into the processing unit 316. In an example, the antenna feed 308 may be communicatively coupled to the transceiver 202 through the circuit board 306. Accordingly, the transceiver 202 may transceive the signal 104 to and from the conductive portion 318. A second feed 310, such as a ground feed may be communicatively coupled between the conductive portion 318 of the input interface 102 and the circuit board 306 to ground electrical energy from the conductive portion 318. In a further example, the second feed 310 may be a second antenna feed to transceive a second signal from the conductive portion 318. For instance, the second feed 310 may support the transmission of multiple communication protocols from the conductive portion 318 simultaneously. The circuit board 306 may be grounded to the housing 304, for instance, to electrically couple the ground element to the housing 304. In the example of FIG. 3, the circuit board 306 may be electrically coupled to the housing 304 by one or more contacts, such as a spring contact 324. In other examples, the circuit board 306 may be electrically isolated from the housing 304.

As shown in the example of FIG. 3, the input interface 102 is a bezel that is rotatably coupled to the housing 304. The conductive portion 318 may be constructed of a material, including but not limited to, silver, copper, gold, aluminum, tungsten, zinc, nickel, iron, or other conductive material. The input interface 102 may be constructed of a solid conductive material (e.g., the conductive portion 318 is the input interface 102) or may be a composite construction including the conductive portion 318 and other materials. In the example of FIG. 3, the conductive portion 318 is the input interface 102. In other words the input interface 102 is a solid conductive material. The size and shape of the conductive portion 318 may be configured to radiate electromagnetic energy in order to transceive the signal 104. For instance, the impedance of the conductive portion 318 may be adjusted with respect to the impedance of the circuit to radiate the signal 104. As previously stated, the conductive portion 318 may be configured as a Planar Inverted-F (PIFA), loop, dipole, monopole, patch, slot, or other configuration of antenna. In various examples the conductive portion 318 may be a continuous loop or may include a plurality of electrically isolated segments. For instance, the segments may include equal lengths or different lengths. The segments may be communicatively coupled to the transceiver or ground element by one or more feeds, such as feed 308 or feed 310. In an example where the conductive portion 318 is a loop antenna, the annular bezel may include a gap separating a first end of the conductive portion 318 from a second end of the conductive portion 318. The antenna feed 308 may be communicatively coupled to the first end and a second antenna feed or ground feed (e.g., a feed 310) may be coupled to the second end of the conductive portion 318. A dielectric material, such as the dielectric 302 may electrically isolate the first end from the second end. In various examples, the conductive portion 318 may be configured as a Near-Field Communication (NFC), Bluetooth, Wi-Fi, Global Positioning system (GPS), Global Navigation Satellite System (GNSS) antenna or other antenna type.

In an example, a positional element, such as positional element 206 (referred to as positional element 312 in the example of FIG. 3), may be a magnet or a fiducial marker. The positional element 312 may be attached to the input interface 102. For instance, the magnet or fiducial marker may be attached by welding, ultra-sonic welding, adhesive, or fastened to the input interface 102. In an example, the positional element 312 may be an integrated visual indicia, including, but not limited to, an engraved marking, molded, machined, painted, or other feature attached or integral to the input interface 102. In a further example, the conductive portion 318 of the input interface 102 may be locally magnetized. For instance, a segment of the conductive portion 318 may be magnetized to construct the positional element 312.

As shown in the example of FIG. 3, the sensor 314 may be located on the circuit board 306. The sensor, such as sensor 208 (also referred to in FIG. 3 as sensor 314) may be located on a path along which the positional element 312 may travel. In operation, the positional element 312 may move with respect to the sensor 314. The sensor 314 may detect the positional element 312 when the positional element 312 and the sensor 314 are aligned. As previously described with regard to sensor 208, the sensor 314 may output a parameter. The parameter may indicate a position of the positional element 312, a number of positional elements 312 that have been detected by the sensor 314 along a direction (e.g., clockwise or counter-clockwise), or which positional element 312 is detected by the sensor 314 at a given time. Accordingly, the sensor 314 may provide a parameter that is indicative of the position of the input interface 102 and correspondingly, the user input. For instance, detecting the user input may include detecting a rotation of the input interface 102, such as a rotation of the annular bezel about a center axis of the bezel in the example of FIG. 3. In other examples, detecting the user input includes detecting a translation of the input interface 102, for instance, where the input interface 102 is a slider.

In a further example, the positional element 312 may include a capacitive, inductive, resistive, or other type of touch-sensor attached to the input interface 102. In operation, the sensor 208 (e.g., the touch-sensor as previously described herein) may detect the user input to the input interface 102. For instance, the touch-sensor may include a capacitive sensor as previously described. The touch-sensor may be located along an upper surface 320 of the input interface 102, lower surface 322 of the input interface 102, or any location therebetween. Accordingly, the touch-sensor may detect a position of a touch or a gesture of the user 106. Because the positional element 312 may be wirelessly detected by the sensor 314, the effects of environmental conditions, such as shock, vibration, thermal cycling, humidity, or the like may be mitigated.

The circuit board 306 may include a Copper Clad Laminate (CCL). The CCL may include the conductive layer (e.g., metallic foil) that may be attached to (e.g., laminated on) one or more dielectric layers of the circuit board 306. The circuit board 306 may include a single sided, double sided, or multi-layer construction. For instance, the circuit board 306 have dielectric layer s fabricated from materials including, but not limited to, FR-4, prepreg, ceramic, epoxy, other glass or fiber filled resin, or the like. In an example, the conductive layer may be electrodeposited (electroplated) onto the circuit board 306. The circuit board 306 may include a ground plane, such as one or more of the conductive layers of the circuit board 306.

A dielectric 302 is located between the conductive portion 318 and the housing 304 to electrically isolate the conductive portion 318 from the housing 304. In an example, the dielectric 302 may include features to fasten the input interface 102 (fixably or movably) to the housing 304. The dielectric 302 may be fabricated from materials including, but not limited to, ABS, FR-4, prepreg, ceramic, epoxy, other glass or fiber filled resin, or the like. The dielectric 302 may provide a radio frequency gap (RF gap) between the conductive portion 318 and ground, such as the ground plane, housing 304 (e.g., metallic or conductive housing 304), or other ground. The RF gap may be alter the antenna gain of the input interface 102. For instance, the RF gap may be tuned for a quarter-wave antenna or a half-wave antenna. In other words, the size of the RF gap may be increased or decreased to adjust the antenna properties of the conductive portion 318. In an example, the efficiency of the antenna may be increased as the RF gap is increased. The RF gap may include, but is not limited to, 0.50 to 2.0 mm in some examples. In an example where the conductive portion 318 includes a plurality of isolated segments, one or more dielectrics 302 may electrically isolate the segments of the conductive portion 318. The dielectric 302 between each segment and the housing 304 may be equal or different lengths. For instance, each dielectric 302 can be tuned for each respective segment. In another example, the dielectric may provide electro static discharge (ESD) protection to the circuit board 306.

In the example of FIG. 3, the antenna feed 308 is communicatively coupled between the conductive portion 318 and the circuit board 306. In other examples, the antenna feed 308 may be communicatively coupled between the conductive portion 318 and the circuit 210, transceiver 202, or processing unit 204 of FIG. 2, or other. The antenna feed 308 may include, but is not limited to, a spring contact, spring probe (e.g., pogo pin), or other slidable electrical connector. For instance, the antenna feed 308 may be slidably coupled between the conductive portion 318 and the circuit board 306, circuit 210, processing unit 204, transceiver 202 or other component. In an example, the antenna feed 308 may include a ratcheting coupling to the conductive portion 318. For instance, the input interface 102 may be rotatable in one direction (e.g., clockwise). The conductive portion 318 may include teeth that are engageable with the antenna feed 308. As the input interface 102 is rotated (e.g., clockwise), a bias element of the antenna feed 308 may compress and the antenna feed 308 may advance to an adjacent tooth of the conductive portion 318. In a further example, the antenna feed 308 may include a ball bearing located between the conductive portion 318 and the bias element. The bias element may provide a contact force between the conductive portion 318 and the antenna feed 308 to reduce the electrical contact resistance of the slidable coupling.

In another example, the conductive portion 318 may be capacitively or inductively coupled to the transceiver 202. For instance, the electronic device 300 may include a primary antenna and the conductive portion 318 may be a parasitic antenna. The signal 104 may be communicated capacitively between the primary antenna and the parasitic antenna (e.g., the conductive portion 318). In a further example, the electronic device may include an inductive coil to induce the signal in the conductive portion 318 for transceiving the signal 104 from the conductive portion 318. Accordingly, the signal 104 may be communicated to the conductive portion 318 wirelessly (e.g., contact-free), and the number of moving parts may be reduced, mechanical wear may be reduced, space constraints may be reduced, or any combination thereof. The conductive portion 318 can be used as an NFC antenna or to boost near-field coupling of an integrated antenna (such as an NFC antenna) integrated in the electronic device 300.

In further examples, the electronic device 300 may include other feeds, such as feed 310 to communicatively couple the conductive element 318. For instance, the other feed 310 may include, but is not limited to, a ground feed, sensor feed, or other electronically conductive feed. The other feed 310 may include a slidable coupling as described with regard to the antenna feed 308 above. The ground feed may provide a ground path between the conductive portion 318 for ESD protection or for antenna grounding. For instance, the ground feed may disperse electrostatic charge build-up from repeated touching of the conductive portion 318 from the user 106. In an example, the feed 310 may be communicatively coupled to an electronic radio-frequency switch to actively control antenna radiation characteristics of the conductive portion 318.

Figure 4:
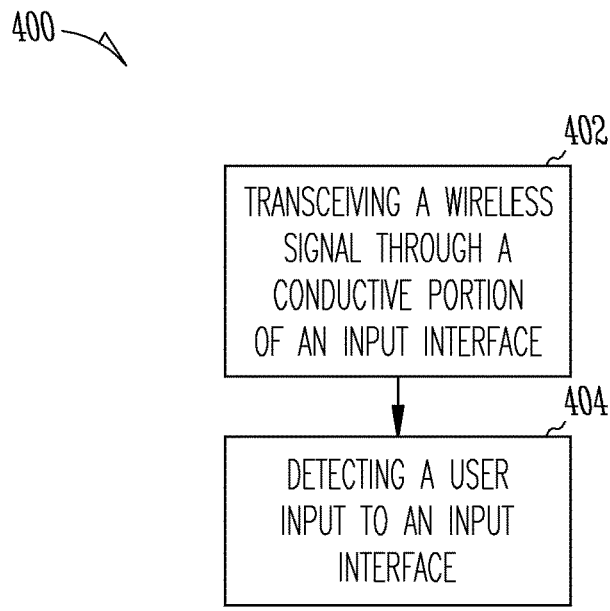
FIG. 4 is flowchart illustrating an exemplary method for a multi-function input interface, according to an embodiment.

FIG. 4 is flowchart illustrating an exemplary method 400 for a multi-function input interface, according to an embodiment. The multi-function input interface for an electronic device may be the electronic device previously described in the examples herein and shown for instance in FIGS. 1-3. In describing the method 400, reference is made to one or more components, features, functions, and processes previously described herein. Where convenient, reference is made to the components, features, processes and the like with reference numerals. Reference numerals provided are exemplary and are nonexclusive. For instance, features, components, functions, processes, and the like described in the method 400 include, but are not limited to, the corresponding numbered elements provided herein. Other corresponding features described herein (both numbered and unnumbered) as well as their equivalents are also considered.

At 402, a wireless signal may be transceived through a conductive portion (e.g., conductive portion 318) of an input interface, such as input interface 102. The conductive portion includes at least one antenna. In various examples, transceiving the wireless signal though the conductive element may include transceiving the signal from an conductive portion including or configured as a loop antenna, Planer Inverted-F antenna, NFC antenna, or other type of antenna. In an example, the signal, such as signal 104, may be generated or processed by a transceiver, such as transceiver 202. The signal may then be communicated between the transceiver and the conductive portion to radiate or receive the signal through the conductive portion. In an example, the signal may be communicated through an antenna feed, such as antenna feed 308, communicatively coupled between the conductive portion and the transceiver. As previously described the antenna feed may include a slidable coupling to the conductive portion. In a further example, the antenna feed may include a bias element.

At 404, a user input at the input interface may be detected based on a parameter from a sensor, such as the touch-sensor or the sensor 208 as previously described herein. In an example, the user input may be a tap, touch, swipe or other gesture along the input interface, for instance, along the conductive portion of the input interface. In a further example, the user input may be movement of the input interface, such as a translation or rotation of the input interface. The user input may be to navigate menus, select items, change settings, input or send messages, or other functions. The user input may be detected in various ways including, but not limited to, identifying movement of a magnetic element of the input interface with the sensor, identifying movement of a fiducial marker of the input interface with an optical sensor, detecting a translation of the input interface (e.g., where the input interface is a slider), detecting movement of the input interface with an array of sensors, sensing the user input with a capacitive electrode (e.g., touch-sensor), sensing the user input with a resistive touch-sensor, sensing the user input with an inductive touch-sensor, or the like. The parameter may include, but is not limited to, a signal corresponding to an open or closed switch, a value of a measured characteristic, image data, or other output of the sensor. The parameter may be received by the circuit (e.g., circuit 210), the processing unit (e.g., processing unit 204), or another component of the electronic device, such as electronic device 100. In an example, the processing unit 204 (or a circuit of passive components) may be configured to perform operations within the electronic device 100 to navigate menus (e.eg change a menu), change settings, transmit or receive signals (e.g., signal 104), present information on a display, or other functions.

Figure 5:
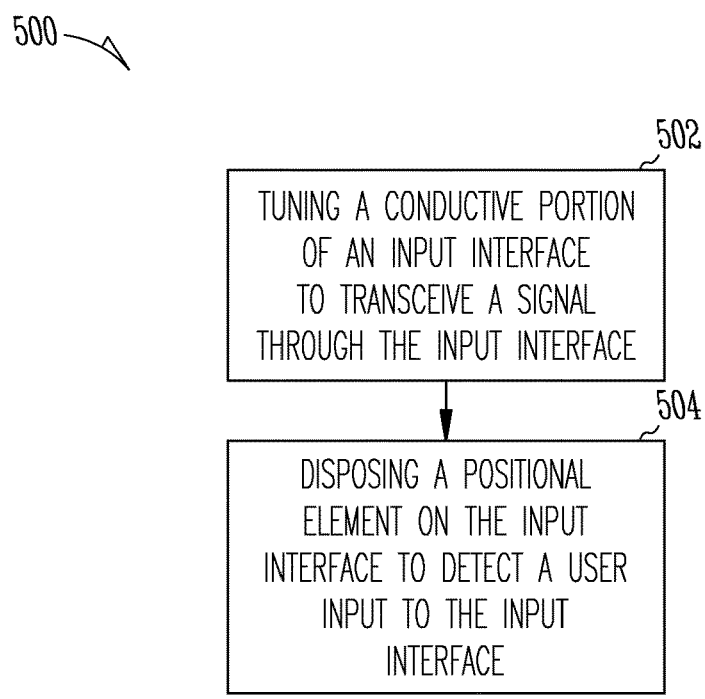
FIG. 5 is flowchart illustrating an exemplary method for making a multi-function input interface, according to an embodiment.

FIG. 5 is flowchart illustrating an exemplary method 500 for making a multi-function input interface, according to an embodiment. In describing the method 500, reference is made to one or more components, features, functions, and processes previously described herein. Where convenient, reference is made to the components, features, processes and the like with reference numerals. Reference numerals provided are exemplary and are nonexclusive. For instance, features, components, functions, processes, and the like described in the method 500 include, but are not limited to, the corresponding numbered elements provided herein. Other corresponding features described herein (both numbered and unnumbered) as well as their equivalents are also considered.

At 502, a conductive portion of an input interface may be tuned to transceive a signal through the input interface. For instance, the conductive portion may be the conductive portion 318, the input interface may be the input interface 102, and the signal may be signal 104 as previously described herein. The signal may include a radiated frequency and wavelength. Tuning the conductive portion may include, but is not limited to, configuring the conductive portion to radiate the signal at the frequency and one-quarter, one-half, or other wavelength. The conductive portion may be provided with a size and shape that is configured to radiate the signal at the frequency or wavelength from the conductive portion. For instance, a length or width of the conductive portion may be adapted to match the impedance of the conductive portion to an impedance of a circuit coupling a transceiver, such as transceiver 202 to the conductive portion. The conductive portion may be isolated from the ground element with a dielectric between the conductive portion and the ground element. A thickness of the dielectric may be adjusted to tune the conductive portion to radiate the signal at the frequency or wavelength. In an example, the feed may be communicatively coupled to an electronic radio-frequency switch to actively control antenna radiation characteristics of the conductive portion.

In an example, the conductive portion may be configured as a loop antenna having a first antenna feed located adjacent to a first and of an open loop. In other examples, the conductive portion may be configured as a Planar Inverted-F, dipole, monopole, patch, or other type of antenna. In various examples, the conductive portion may be configured as a GSM, WCDMA, LTE, NFC, Bluetooth, Wi-Fi, GPS, Global Navigation Satellite System (GNSS) antenna or other antenna type.

At 504, a positional element, such as positional element 206 or 312, may be disposed on the input interface to detect a user input to the input interface. In an example, the positional element may include, but is not limited to, a touch-sensor, such as a capacitive, inductive, resistive, or other sensor to detect the user input. Disposing the positional element on the input interface may include attaching the positional element to the input interface by welding, ultrasonic welding, adhesive, a fastener or the like. The touch-sensor may be located along a top surface of the input interface, bottom surface of the input interface, or any location therebetween. Accordingly, the touch-sensor may detect a position of a touch or a gesture of the user.

In a further example the input interface may be movably coupled to the electronic device, such as electronic device 100. For instance, the input interface may include rotatably coupling the input interface to the electronic device. The input interface may be an annular bezel that is rotatable about a center axis of the bezel to receive the user input. In a further example, the input interface may be slidably coupled to the electronic device. For instance, the input interface may be configured to translate with respect to the electronic device.

In an example, a positional element, such as positional element 206 or 312, may be a magnet or a fiducial marker. The positional element may be attached to the input interface. For instance, the magnet or fiducial marker may be welded, bonded with adhesive, or fastened to the input interface. In an example, the positional element may be an integrated visual indicia, including, but not limited to, an engraved marking, molded, machined, or painted, or other feature attached or integral to the input interface. In a further example, the conductive portion may be locally magnetized. For instance, a segment of the conductive portion may be magnetized to construct the positional element. In a further example, a plurality of positional elements may be disposed on the input interface. One or more of the positional elements may be different than other positional elements to represent various positions of the input interface. For instance, the various positional elements may represent a length of travel, degree of rotation, or other measure of movement of the input interface.

The sensor, such as sensor 208 or a sensor 314, may be located on a path along which the positional element travels when the input interface is moved. For instance, the sensor may be located on the circuit board, such as circuit board 306. In a further example, the sensor may be located on the input interface and the positional element may be disposed on the circuit board, housing, or other component of the electronic device. In operation, the positional element may move with respect to the sensor. The sensor may detect the positional element when the positional element and the sensor are aligned. As previously described, the sensor may output a parameter. The parameter may indicate a position of the positional element, a number of positional elements that have been detected by the sensor along a direction (e.g., clockwise or counter-clockwise), or which positional element is detected by the sensor at a given time. Accordingly, the sensor may provide a parameter that is indicative of the position of the input interface and correspondingly, communicate the user input to the processing unit. For instance, detecting the user input may include detecting a rotation of the input interface, such as a rotation of the annular bezel about a center axis of the bezel. In other examples, the detecting the user input includes detecting a translation of the input interface, for instance, where the input interface is a slider. In an example, the sensor may detect one or more positional elements and output different parameters based on which positional element is detected. In a further example, the electronic device may include a plurality of sensors to detect one or more positional elements. For instance, movement of the input interface may be determined by which sensor detects the positional element.

The positional element or the sensor may be calibrated to detect the user input. For instance, where the positional element includes a touch-sensor, the sensitivity of the sensor may be adjusted to determine the user input. In a further example, the position of an electrode or a plurality of electrodes may be adjusted to calibrate the positional element to detect the user input.

The method may include communicatively coupling the conductive portion to one or more of a circuit (e.g., circuit board 306), transceiver (e.g., transceiver 202), processing unit (e.g., processing unit 204), sensor, positional element, or other component of the electronic device. A slidable coupling may communicatively couple the conductive portion to the circuit, transceiver, processing unit, sensor, positional element, or other component. The slidable coupling may include, but is not limited to, a spring probe, spring contact, or other type of slidable electrical contact. A bias element may be included in the slidable coupling to provide contact force and reduce contact resistance between the conductive portion and the circuit, transceiver, processing unit, sensor, positional element or other component.

In an example, the conductive portion may be communicatively coupled to the transceiver with an antenna feed, such as antenna feed 308. The antenna feed may be configured to communicate the signal from the transceiver to the input to radiate the signal. The antenna feed may be configured to communicate the signal received by the conductive portion to the transceiver. The conductive portion may be grounded to a ground element, such as a ground plane on the circuit board 306 or the housing, by a grounding feed. In various examples, the antenna feed or the grounding feed may include, but are not limited to, a spring probe, spring contact, slidable electrical contact, conductive foam, conductive pad, or other type of electrical connection. In a further example, the antenna feed may be inductively or capacitively coupled to the conductive portion. For instance, the antenna feed may include a radiating element (e.g., microstrip antenna), inductive element (e.g., inductive coil), or the like to wirelessly transmit the signal from the transceiver to the conductive portion.

Figure 6:
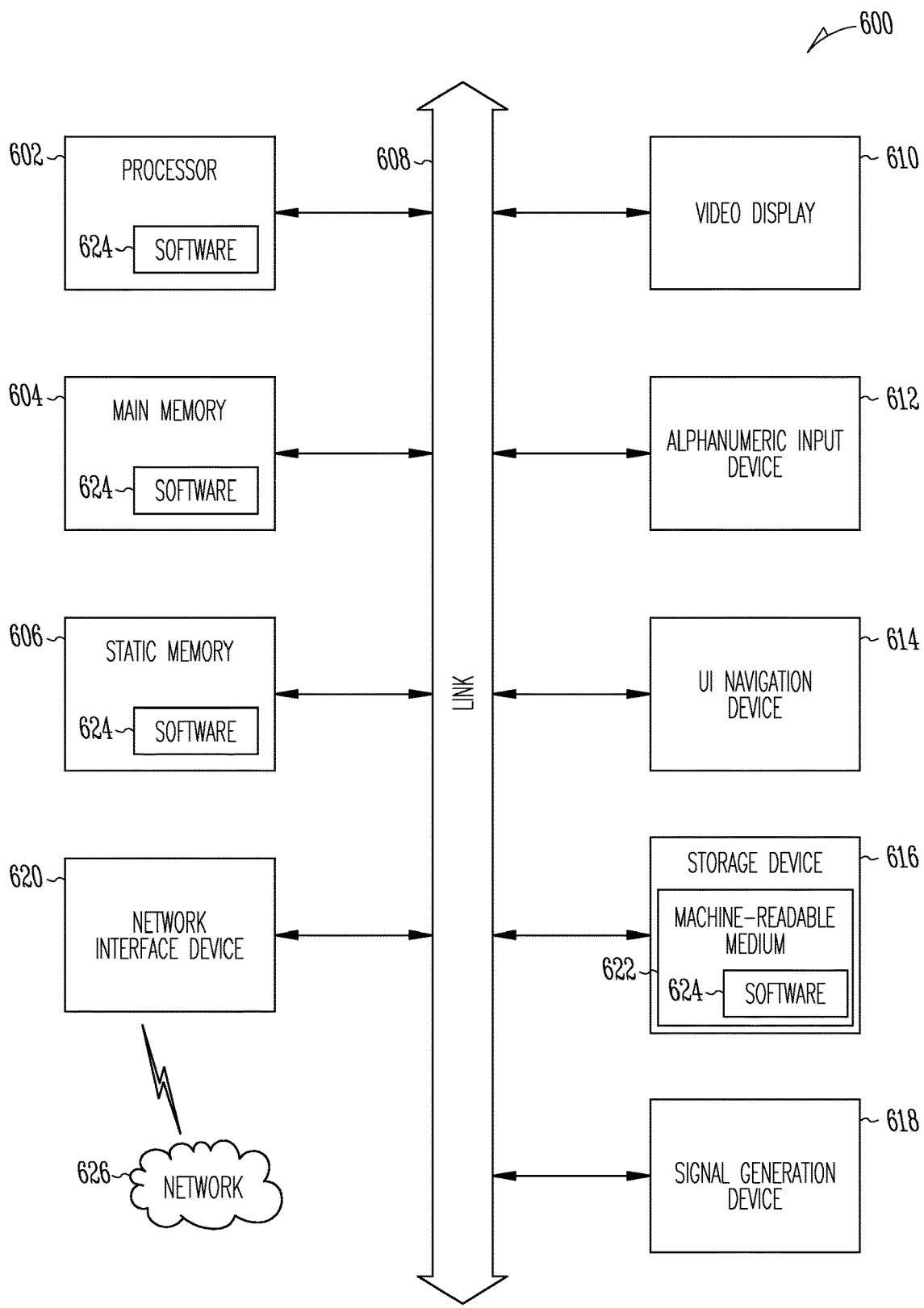
FIG. 6 is a system diagram of an exemplary electronic device including a multi-function input interface, according to an embodiment.

FIG. 6 is a block diagram illustrating an example machine 600 upon which any one or more of the devices (e.g., electronic devices, such as electronic device 100) or techniques (e.g., methods, such as method 400 or 500) discussed herein may perform. In alternative embodiments, the machine 600 may operate as a standalone device or may be connected (e.g., networked) to other machines. The machine 600 may be a personal computer (PC), a tablet PC, a set-top box (STB), a Personal Digital Assistant (PDA), a mobile telephone, a web appliance, a network router, switch or bridge, watch, smartwatch, smart home system, internet-of-things device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer, or computer system) 600 may include a hardware processor 602 (e.g., a CPU, GPU, a hardware processor core, or any combination thereof), a main memory 604, and a static memory 606, some or all of which may communicate with each other via an interlink (e.g., bus) 608. The machine 600 may further include a display device 610, an alphanumeric input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The mass storage device 626 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine readable media.

While the machine readable medium 622 is illustrated as a single medium, the term "machine readable medium" may include a single medium or multiple media (e.g., a centralized or distributed database, and/or associated caches and servers) that arranged to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received (e.g., transceived) over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 602.11 family of standards known as Wi-Fi®, IEEE 602.16 family of standards known as WiMAX®), peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Various Notes & Examples

Each of these non-limiting examples may stand on its own, or may be combined in various permutations or combinations with one or more of the other examples. To better illustrate the method and apparatuses disclosed herein, a non-limiting list of embodiments is provided here:

Example 1 is a multi-function input interface for an electronic device, the input interface comprising: a conductive portion to transceive a signal through the input interface; and a positional element to detect a user input to the input interface.

In Example 2, the subject matter of Example 1 optionally includes a transceiver communicatively coupled to the conductive portion.

In Example 3, the subject matter of Example 2 optionally includes wherein the transceiver is communicatively coupled to the conductive portion by an antenna feed, the antenna feed slidably coupled between the conductive portion and the transceiver.

In Example 4, the subject matter of Example 3 optionally includes wherein the conductive portion includes a plurality of electrically isolated segments, a plurality of antenna feeds communicatively couple each segment respectively to the transceiver.

In Example 5, the subject matter of any one or more of Examples 3-4 optionally include wherein the antenna feed includes a bias element.

In Example 6, the subject matter of any one or more of Examples 3-5 optionally include wherein the antenna feed is a capacitive coupling to the conductive portion.

In Example 7, the subject matter of any one or more of Examples 3-6 optionally include wherein the antenna feed includes an inductive coupling to the conductive portion.

In Example 8, the subject matter of any one or more of Examples 1-7 optionally include wherein the input interface includes a grounding feed coupled between the conductive portion and a ground element.

In Example 9, the subject matter of any one or more of Examples 1-8 optionally include wherein the system includes a dielectric between the conductive portion and a ground element.

In Example 10, the subject matter of any one or more of Examples 1-9 optionally include wherein the conductive portion includes a plurality of electrically isolated segments, and a plurality of dielectric elements are disposed between the respective segments and a housing, each dielectric element including a different thickness.

In Example 11, the subject matter of any one or more of Examples 1-10 optionally include a circuit, wherein the circuit is communicatively coupled to the conductive portion and the positional element.

In Example 12, the subject matter of any one or more of Examples 1-11 optionally include wherein the input interface includes a loop antenna, wherein the loop antenna includes a first end and a second loop end and the loop antenna is communicatively coupled to a first antenna feed located adjacent to the first end.

In Example 13, the subject matter of any one or more of Examples 1-12 optionally include wherein the input interface is a Planar Inverted-F antenna.

In Example 14, the subject matter of any one or more of Examples 1-13 optionally include wherein the input interface is a near-field communication antenna.

In Example 15, the subject matter of any one or more of Examples 1-14 optionally include wherein the input interface is movable to receive the user input.

In Example 16, the subject matter of any one or more of Examples 1-15 optionally include wherein the input interface is an annular bezel and is rotatable about a center axis of the bezel to receive the user input.

In Example 17, the subject matter of any one or more of Examples 1-16 optionally include wherein the positional element is to detect a position of the input interface relative to the electronic device.

In Example 18, the subject matter of any one or more of Examples 1-17 optionally include wherein the input interface is a slider to receive the user input.

In Example 19, the subject matter of any one or more of Examples 1-18 optionally include wherein the positional element includes a sensor to detect the user input to the input interface.

In Example 20, the subject matter of any one or more of Examples 1-19 optionally include wherein the positional element is magnetic and movement of the positional element is identifiable by a sensor to detect the user input.

In Example 21, the subject matter of any one or more of Examples 1-20 optionally include a sensor to identify a location of the positional element, wherein the positional element is a fiducial marker and the sensor is an optical sensor.

In Example 22, the subject matter of any one or more of Examples 1-21 optionally include wherein the electronic device includes an array of sensors to detect the user input.

In Example 23, the subject matter of any one or more of Examples 1-22 optionally include wherein the positional element is a capacitive electrode to detect the user input to the input interface.

In Example 24, the subject matter of any one or more of Examples 1-23 optionally include wherein the positional element is an inductive sensor to detect the user input.

In Example 25, the subject matter of any one or more of Examples 1-24 optionally include a processing unit, wherein the processing unit includes a transceiver and receives input from a sensor.

Example 26 is a method for a multi-function input interface for an electronic device, wherein the input interface includes a conductive portion, the method comprising: transceiving a wireless signal through the conductive portion of the input interface, wherein the conductive portion is an antenna; and detecting a user input to the input interface based on a parameter from a sensor.

In Example 27, the subject matter of Example 26 optionally includes wherein detecting the user input includes detecting movement of the input interface with the sensor.

In Example 28, the subject matter of Example 27 optionally includes wherein detecting the user input includes identifying movement of a magnetic element of the input interface with the sensor.

In Example 29, the subject matter of any one or more of Examples 27-28 optionally include wherein detecting the user input includes identifying movement of a fiducial marker with an optical sensor to detect movement of the input interface.

In Example 30, the subject matter of any one or more of Examples 27-29 optionally include wherein detecting the user input includes detecting rotation of the input interface, the input interface including an annular bezel rotatable about a center axis of the bezel to receive the user input.

In Example 31, the subject matter of any one or more of Examples 27-30 optionally include wherein detecting the user input includes detecting a translation of the input interface, wherein the input interface is a slider to receive the user input.

In Example 32, the subject matter of any one or more of Examples 27-31 optionally include wherein detecting the user input includes detecting movement of the input interface with an array of sensors.

In Example 33, the subject matter of any one or more of Examples 26-32 optionally include wherein detecting the user input includes sensing the user input with a capacitive electrode.

In Example 34, the subject matter of any one or more of Examples 26-33 optionally include wherein transceiving the wireless signal though the conductive portion includes transceiving the signal from the conductive portion, wherein the conductive portion is a loop antenna.

In Example 35, the subject matter of any one or more of Examples 26-34 optionally include wherein transceiving the wireless signal though the conductive portion includes transceiving the signal from the conductive portion, wherein the conductive portion is a Planar Inverted-F antenna.

In Example 36, the subject matter of any one or more of Examples 26-35 optionally include wherein transceiving the wireless signal though the conductive portion includes transceiving the signal from the conductive portion, wherein the conductive portion is a near-field communication antenna.

In Example 37, the subject matter of any one or more of Examples 26-36 optionally include transceiving the wireless signal between a transceiver and the conductive portion by an antenna feed, wherein the antenna feed includes a slidable coupling.

In Example 38, the subject matter of any one or more of Examples 26-37 optionally include transceiving the wireless signal between a transceiver and the conductive portion by an antenna feed, wherein the antenna feed includes a slidable coupling and the slidable coupling includes a bias element.

In Example 39, the subject matter of any one or more of Examples 26-38 optionally include wherein transceiving a wireless signal through the conductive portion includes transceiving a plurality of different wireless signals through a plurality of electrically isolated segments of the conductive portion, a plurality of antenna feeds corresponding to the plurality of signals respectively communicatively couple each segment respectively to the transceiver.

In Example 40, the subject matter of any one or more of Examples 26-39 optionally include changing a setting of an electronic device based on the parameter.

In Example 41, the subject matter of any one or more of Examples 26-40 optionally include changing a menu based on the parameter.

Example 42 is at least one machine-readable medium including instructions, which when executed by a machine, cause the machine to perform operations of any of the methods of Examples 26-41.

Example 43 is an apparatus comprising means for performing any of the methods of Examples 26-41.

Example 44 is a method for a multi-function input interface for an electronic device, the method comprising: tuning a conductive portion of an input interface to transceive a signal through the input interface; and disposing a positional element on the input interface to detect a user input to the input interface.

In Example 45, the subject matter of Example 44 optionally includes calibrating the positional element to detect the user input.

In Example 46, the subject matter of any one or more of Examples 44-45 optionally include communicatively coupling the conductive portion to a transceiver through an antenna feed.

In Example 47, the subject matter of Example 46 optionally includes wherein the antenna feed includes a slidable coupling.

In Example 48, the subject matter of Example 47 optionally includes wherein the slidable coupling includes a bias element.

In Example 49, the subject matter of any one or more of Examples 44-48 optionally include grounding the conductive portion to a ground element with a grounding feed.

In Example 50, the subject matter of any one or more of Examples 44-49 optionally include isolating the conductive portion from a ground element with a dielectric between the conductive portion and the ground element.

In Example 51, the subject matter of any one or more of Examples 44-50 optionally include isolating the conductive portion from a ground element with a dielectric between the conductive portion and the ground element, wherein the conductive portion includes a plurality of electrically isolated segments, and a plurality of dielectric elements are disposed between the respective segments and a housing, each dielectric element including a different thickness.

In Example 52, the subject matter of any one or more of Examples 44-51 optionally include capacitively coupling an antenna feed to the conductive portion.

In Example 53, the subject matter of any one or more of Examples 44-52 optionally include inductively coupling an antenna feed to the conductive portion.

In Example 54, the subject matter of any one or more of Examples 44-53 optionally include communicatively coupling a circuit to the conductive portion and the positional element.

In Example 55, the subject matter of any one or more of Examples 44-54 optionally include communicatively coupling a processing unit to a transceiver and to the positional element.

In Example 56, the subject matter of any one or more of Examples 44-55 optionally include communicatively coupling a transceiver to the conductive portion.

In Example 57, the subject matter of any one or more of Examples 44-56 optionally include communicatively coupling a circuit to the positional element.

In Example 58, the subject matter of any one or more of Examples 44-57 optionally include communicatively coupling a processing unit to the conductive portion and the positional element.

In Example 59, the subject matter of any one or more of Examples 44-58 optionally include wherein tuning the conductive portion includes tuning a loop antenna, wherein the loop antenna includes a first end and a second end, and a first antenna feed is communicatively coupled adjacently to the first end.

In Example 60, the subject matter of any one or more of Examples 44-59 optionally include wherein tuning the conductive portion includes tuning the conductive portion, wherein the conductive portion is a Planar Inverted-F antenna.

In Example 61, the subject matter of any one or more of Examples 44-60 optionally include wherein tuning the conductive portion includes tuning the conductive portion, wherein the conductive portion is a near-field communication antenna.

In Example 62, the subject matter of any one or more of Examples 44-61 optionally include wherein tuning the conductive portion includes tuning the conductive portion, wherein the conductive portion includes a plurality of electrically isolated segments, a plurality of antenna feeds communicatively couple each segment respectively to a transceiver.

In Example 63, the subject matter of any one or more of Examples 44-62 optionally include movably coupling the input interface to the electronic device.

In Example 64, the subject matter of Example 63 optionally includes wherein movably coupling the input interface includes rotatably coupling the input interface to the electronic device, wherein the input interface is an annular bezel and is rotatable about a center axis of the bezel to receive the user input.

In Example 65, the subject matter of any one or more of Examples 44-64 optionally include wherein disposing a positional element includes disposing a sensor to detect the user input to the input interface.

In Example 66, the subject matter of any one or more of Examples 44-65 optionally include wherein disposing a positional element includes disposing a magnet on the input interface, the magnet detectable by a sensor to identify movement of the positional element.

In Example 67, the subject matter of any one or more of Examples 44-66 optionally include wherein disposing a positional element includes disposing a fiducial marker on the input interface, the fiducial marker detectable by an optical sensor to identify a location of the fiducial marker.

In Example 68, the subject matter of any one or more of Examples 44-67 optionally include communicatively coupling an array of sensors to the electronic device to detect the user input.

In Example 69, the subject matter of any one or more of Examples 44-68 optionally include wherein disposing a positional element includes disposing a capacitive electrode on the input interface.

In Example 70, the subject matter of any one or more of Examples 44-69 optionally include wherein disposing a positional element includes disposing an inductive sensor to detect the user input.

In Example 71 is a multi-function input interface comprising: a means for transceiving a wireless signal through a conductive portion of an input interface, wherein the conductive portion is an antenna; and a means for detecting a user input to the input interface of the input interface based on a parameter from a sensor.

In Example 72, the subject matter of Example 71 optionally includes wherein the means for detecting the user input includes means for detecting movement of the input interface with the sensor.

In Example 73, the subject matter of Example 72 optionally includes wherein the means for detecting the user input includes means for identifying movement of a magnetic element of the input interface with the sensor.

In Example 74, the subject matter of any one or more of Examples 72-73 optionally include wherein the means for detecting the user input includes means for identifying movement of a fiducial marker with an optical sensor to detect movement of the input interface.

In Example 75, the subject matter of any one or more of Examples 72-74 optionally include wherein the means for detecting the user input includes means for detecting rotation of the input interface, the input interface including an annular bezel rotatable about a center axis of the bezel to receive the user input.

In Example 76, the subject matter of any one or more of Examples 72-75 optionally include wherein the means for detecting the user input includes means for detecting a translation of the input interface, wherein the input interface is a slider to receive the user input.

In Example 77, the subject matter of any one or more of Examples 72-76 optionally include wherein the means for detecting the user input includes means for detecting movement of the input interface with an array of sensors.

In Example 78, the subject matter of any one or more of Examples 71-77 optionally include wherein means for detecting the user input includes means for sensing the user input with a capacitive electrode.

In Example 79, the subject matter of any one or more of Examples 71-78 optionally include wherein the means for transceiving the wireless signal though the conductive portion includes means for transceiving the signal from the conductive portion that is a loop antenna.

In Example 80, the subject matter of any one or more of Examples 71-79 optionally include wherein the means for transceiving the wireless signal though the conductive portion includes means for transceiving the signal from the conductive portion that is a Planar Inverted-F antenna.

In Example 81, the subject matter of any one or more of Examples 71-80 optionally include wherein the means for transceiving the wireless signal though the conductive portion includes means for transceiving the signal from the conductive portion that is a near-field communication antenna.

In Example 82, the subject matter of any one or more of Examples 71-81 optionally include a means for transceiving the wireless signal between a transceiver and the conductive portion with a slidable coupling.

In Example 83, the subject matter of any one or more of Examples 71-82 optionally include a means for transceiving the wireless signal between a transceiver and the conductive portion by a slidable coupling, wherein the slidable coupling includes a bias element.

In Example 84, the subject matter of any one or more of Examples 71-83 optionally include a means for transceiving a plurality of different wireless signals between a transceiver and a plurality of electrically isolated segments of the conductive portion, wherein a plurality of antenna feeds corresponding to the plurality of segments communicatively couple each segment respectively to the transceiver.

In Example 85, the subject matter of Example 84 optionally includes wherein the means for electrically isolating the segments includes electrically isolating the plurality of segments from a ground element with a plurality of respective dielectric elements located between the respective segment and the ground element, wherein the plurality of dielectric elements include different thicknesses.

In Example 86, the subject matter of any one or more of Examples 71-85 optionally include a means for changing a setting of an electronic device based on the parameter.

In Example 87, the subject matter of any one or more of Examples 71-86 optionally include a means for changing a menu based on the parameter.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods.

The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. An electronic device, comprising:
   a display lens; and
   a multi-function input interface distinct from the display lens and rotationally coupled to electronic device, the multi-function input interface comprising:
      a conductive portion configured to rotate around an area of the electronic display lens and to transmit and receive a signal through the multi-function input interface; and
      a positional element that is fixedly coupled to the conductive portion and configured to detect a user input to the multi-function input interface based on a rotation of the conductive portion around the area of the display lens,
   wherein the multi-function input interface circumscribes the area of the display lens.

2. The electronic device of claim 1, further comprising a transceiver communicatively coupled to the conductive portion.

3. The electronic device of claim 2, wherein the transceiver is communicatively coupled to the conductive portion by an antenna feed, the antenna feed slidably coupled between the conductive portion and the transceiver.

4. The electronic device of claim 3, wherein the conductive portion includes a plurality of electrically isolated segments, a plurality of antenna feeds communicatively couples each segment respectively to the transceiver.

5. The electronic device of claim 1, wherein the multi-function input interface is a Planar Inverted-F antenna.

6. The electronic device of claim 1, wherein the positional element is to detect a position of the multi-function input interface relative to the electronic device.

7. The electronic device of claim 1, the positional element comprising a sensor to detect the user input to the multi-function input interface.

8. The electronic device of claim 1, wherein the positional element comprises a magnetic component and movement of the positional element is identifiable by a sensor to detect the user input.

9. The electronic device of claim 1, further comprising a sensor to identify a location of the positional element, wherein the positional element comprises a fiducial marker and the sensor is an optical sensor.

10. The electronic device of claim 1, wherein the positional element comprises a capacitive electrode to detect the user input to the multi-function input interface.

11. A method for a multi-function input interface that is rotationally coupled to an electronic device, wherein the multi-function input interface includes a conductive portion, the method comprising:
   transceiving a wireless signal through the conductive portion of the multi-function input interface, wherein the conductive portion comprises an antenna that is configured to circumscribe an display lens of the electronic device and rotate relative to the display lens, the multi-function input interface being separate from the electronic display lens; and
   detecting a user input to the multi-function input interface based on a parameter from a sensor, the sensor comprising a first element that is fixedly coupled to the electronic device and second element that is fixedly coupled to, and overlapping, an area of the conductive portion, the parameter indicating a rotational displacement of the conductive portion relative to the electronic device.

12. The method of claim 11, wherein detecting the user input includes detecting a rotation of the multi-function input interface with the sensor.

13. The method of claim 12, wherein detecting the user input includes identifying movement of a magnetic element of the multi-function input interface with the sensor.

14. The method of claim 12, wherein detecting the user input includes identifying movement of a fiducial marker with an optical sensor to detect movement of the multi-function input interface.

15. The method of claim 11, wherein detecting the user input includes sensing the user input with a capacitive electrode.

16. The method of claim 11, wherein transceiving the wireless signal though the conductive portion includes transceiving the wireless signal from the conductive portion, wherein the conductive portion is a loop antenna.

17. The method of claim 11, wherein transceiving a wireless signal through the conductive portion includes transceiving a plurality of different wireless signals through a plurality of electrically isolated segments of the conductive portion, a plurality of antenna feeds corresponding to the plurality of different wireless signals respectively communicatively couple each segment respectively to a transceiver communicatively coupled to the conductive portion.

18. The method of claim 11, further comprising changing a setting of an electronic device based on the parameter.

19. The method of claim 11, further comprising changing a menu based on the parameter.

20. A method for a multi-function input interface that is rotationally coupled to an electronic device, the electronic device comprising an display lens, the method comprising:
   rotating a conductive portion of the multi-function input interface relative to the display lens to transmit and receive a radio signal through the multi-function input interface, the multi-function input interface circumscribing the display lens, the multi-function input interface being distinct from the display lens; and
   disposing a positional element on the multi-function input interface to detect a user input to the multi-function input interface based on a rotation of the conductive portion relative to the electronic device, the positional element fixedly disposed over an area of the multi-function input interface overlapping the conductive portion.

21. The method of claim 20, further comprising inductively coupling an antenna feed to the conductive portion.

22. The method of claim 20, further comprising communicatively coupling a transceiver to the conductive portion.

23. The method of claim 20, further comprising movably coupling the multi-function input interface to the electronic device.

24. The method of claim 20, wherein disposing a positional element includes disposing a magnet on the multi-function input interface, the magnet detectable by a sensor to identify movement of the positional element.

25. The method of claim 20, wherein disposing a positional element includes disposing a fiducial marker on the multi-function input interface, the fiducial marker detectable by an optical sensor to identify a location of the fiducial marker.

* * * * *